May 21, 1946. J. DE MARIO Re. 22,757

MULTIPLE PENCIL

Original Filed Feb. 8, 1935

INVENTOR
JOSEPH DE MARIO
BY Adam E. Fisher
ATTORNEY

Reissued May 21, 1946

Re. 22,757

UNITED STATES PATENT OFFICE 22,757

MULTIPLE PENCIL

Joseph De Mario, Pennsauken, N. J.

Original No. 2,025,938, dated December 31, 1935, Serial No. 5,517, February 8, 1935. Application for reissue February 7, 1946, Serial No. 646,191

9 Claims. (Cl. 120—14)

My invention relates to improvements in poly-pointed or multiple lead pencils and crayons and the main object is to provide in simple, attractive and inexpensive form a pencil having a number of leads or crayons of differing colors or grades and any of which may be projected from the pencil and exposed for writing or drawing while those not in use remain concealed and protected from breakage.

Another object is to provide a pencil of this kind of a minimum number of working parts comprising simply a tubular barrel or stock into which a number of segmental leads or crayons may be slidably inserted, the said barrel having inner longitudinal dividing ribs or beads between the leads and having longitudinal slots registering with the leads through which slots an ear on a sliding band on the barrel may be engaged with any of the leads for projecting the same outward from the barrel at one end, the said band being substantially larger in diameter than the barrel and the barrel near the working or lower end having outwardly projecting ribs into which the band may be forced to constrict the barrel slightly on the leads and hold them in adjusted position.

With these and other objects in view the invention resides in the novel construction and arrangement of parts as hereinafter fully set forth and claimed, reference being had to the accompanying drawing wherein:

Figure 1:
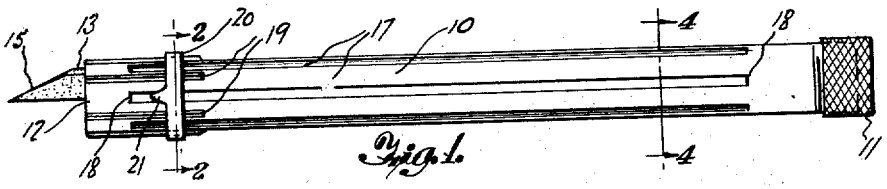
Fig. 1 is a side view of my pencil.
Figure 2:
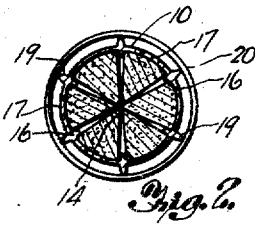
Fig. 2 is an enlarged section along the line 2—2 in Fig. 1.
Figure 3:
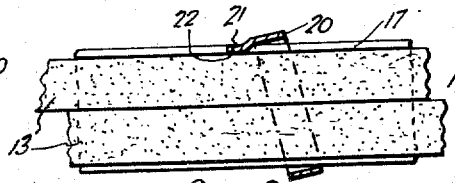
Fig. 3 is an enlarged fragmental longitudinal section showing the action of the band in moving the leads.
Figure 4:
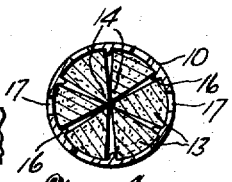
Fig. 4 is an enlarged section along the line 4—4 in Fig. 1.
Figure 5:
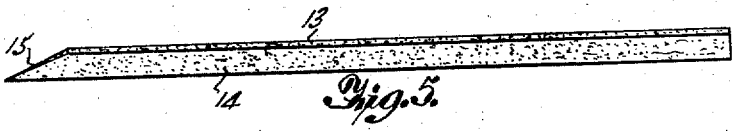
Fig. 5 is a side of one of the leads or crayons alone.

Referring now with more particularity to the drawing, my invention as shown in Figs. 1 to 5 comprises an elongated tubular barrel or body 10 of thin metal or other suitable material and closed at one end by a screw cap or other suitable device 11 and open at its other, and as hereinafter termed, working end 12. The leads or crayons 13 are of segmental or sector-like cross-section so that when arranged with their sharp edges or apices 14 turned inward together they form a mutually supporting cable-like assembly of such exterior diameter and shape as to just nicely slide in and frictionally engage the inner periphery of the barrel 10. The inner longitudinal edges of the leads or crayons are located at the longitudinal axis of the barrel. At their intended working ends the leads 13 are sharpened or tapered off toward the apices 14 as indicated at 15. Inside the barrel 10 a plurality of radially spaced inwardly projecting longitudinal guide ribs or beads 16 are formed and occur between each lead 13 and the next whereby these leads are separated slightly to permit free longitudinal movement of any one without disturbing the others.

The barrel 10 also has a number of longitudinal radially spaced slots 17 occurring in registry with the leads 13 as they are placed in the barrel, the said slots terminating short of each end of the barrel as indicated at 18. Slots 17 are located approximately midway between adjacent guide ribs 16. Intermediate the slots 17 and at the working end 12 of the barrel outwardly projecting pressure ribs 19 are formed and extend inwardly along the barrel past the adjacent ends 18 of the slots as shown. An annular sliding band 20 of somewhat greater diameter than the barrel 10 is slidably mounted thereon and has a laterally projecting ear or finger 21 serrated on its under or inner side as at 22.

In use, any one of the sharpened ends 15 of the leads 13 may be projected out from the working end 12 of the barrel 10 by rotating the band 20 to bring the ear 21 to the slot 17 in the desired lead and then tilting the band (Fig. 3) to bring the serrated face 22 of the band to engagement with the lead through the slot after which the lead may be moved by sliding the band along the barrel. The leads may then be secured in adjusted position by sliding the band 20 down over the ribs 19 which have a projection calculated to bring an inward compression or construction on the barrel when the band 20 is forced over the ribs. Sufficient resiliency in the barrel 10 is provided for its constriction in this manner both by the thinness of its walls and the slots 17 which extend between the ribs 19 as set forth.

The utility of such a pencil will at once be apparent, affording as it does a conveniently and selectively used assortment of leads or crayons of different colors or degrees. The pencil is furthermore inexpensive in manufacture, simple and convenient in use and attractive in appearance.

Figure 6:
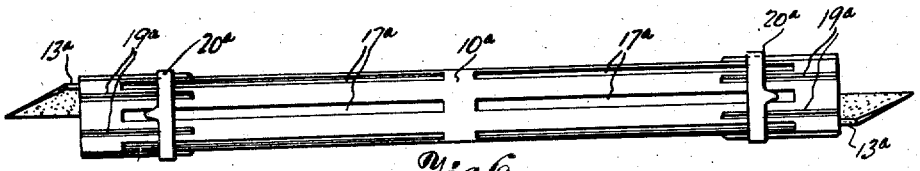
Fig. 6 is a side view of a modified double-ended form of my pencil.

In Fig. 6, a double ended pencil is shown wherein all the foregoing parts are duplicated at each end of the barrel 10a, the slots 17a and ribs 19a being provided at each end of the barrel with separate bands 20a for moving and manipulating a different and separate set of leads 13a at each end as shown. The color range or capacity of the pencil is thus doubled by this arrangement as will be understood.

Figure 7:
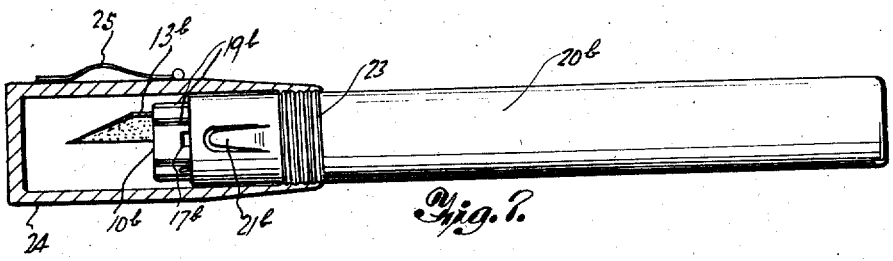
Fig. 7 is a side view, partially in section of a modified enclosed form of pencil.
Figure 8:
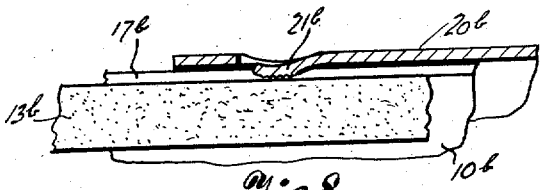
Fig. 8 is a fragmental longitudinal section through the pencil of Fig. 7 showing the action of the sleeve in moving one of the leads.

In Figs. 7 and 8 an enclosed form of the pencil is shown wherein the barrel 10b with its slots 17b, ribs 19b and leads 13b are exactly as shown in Fig. 1 but the band 20 is replaced by an elongated tubular sleeve 20b almost entirely covering the barrel and having a spring leaf near 21b punched out of one side so that it may be pressed through any one of the slots 18b to manipulate the leads when the sleeve is slid over the barrel. The sleeve 20b has threads 23 adjacent its end over the working end of the pencil and a cap 24 is threaded thereon to protect the end of the pencil. This cap 24 has a conventional clip 25 for carrying the pencil in the pocket.

In the claims, the word "crayon" is intended to include a stick of marking material of a composition including graphite, such as is used for pencil leads. The term includes all colored compositions which are used to make visible marks or streaks on suitable surfaces.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a pencil, a barrel, a plurality of segmental leads slidably mounted in and filling the barrel, and means for projecting any of the leads from the barrel independently of the others.

2. In a pencil, a barrel, a plurality of leads of sector-like cross section slidably mounted in and filling the interior of the barrel, ribs extended longitudinally in the barrel separating the outer sides of the leads, the said barrel also having longitudinally extended slots registering with the leads, and means mounted on the barrel for engagement with the leads through the slots for selecting and projecting any lead from the barrel.

3. In a pencil, a barrel, a plurality of leads of sector-like cross section slidably mounted in and filling the interior of the barrel, ribs extended longitudinally in the barrel separating the outer sides of the leads, the said barrel also having longitudinally extended slots registering with the leads, and means mounted on the barrel for engagement with the leads through the slots for selecting and projecting any lead from the barrel, the said means comprising an elongated tubular sleeve loosely fitting the barrel, a spring ear on the sleeve for engaging the leads, ribs projected outwardly from the barrel at one end between the said slots for engagement by the sleeve to constrict the barrel on the leads, and a cap threaded on the sleeve enclosing the end of the barrel.

4. In a pencil, a barrel, a plurality of leads of sector-like cross section slidably mounted in and filling the interior of the barrel, ribs projecting inwardly and longitudinally extending along the interior of the barrel between the outer sides of the leads, the said barrel also having longitudinally extending slots registering with the outer sides of the leads, an annular band loosely and slidably mounted around the barrel, and a laterally projecting ear on the band adapted to engage a lead through one of the said slots whereby any one of the leads may be projected out the end of the barrel.

5. In a pencil, a barrel, a plurality of leads of sector-like cross section slidably mounted in and filling the interior of the barrel, ribs projecting inwardly and longitudinally extending along the interior of the barrel between the outer sides of the leads, the said barrel also having longitudinally extending slots registering with the outer sides of the leads, an annular band loosely and slidably mounted around the barrel, and a laterally projecting ear on the band adapted to engage a lead through one of the said slots whereby any one of the leads may be projected out the end of the barrel, and pressure ribs extended outwardly from the barrel adjacent one end and adapted to constrict the end of the barrel on the leads when the band is slipped over the said pressure ribs.

6. In a pencil, a cylindrical hollow barrel, and a plurality of segmental crayons slidably mounted in and filling said barrel, the inner longitudinal edges of said crayons being at the longitudinal axis of said barrel, and means for projecting any of said crayons from the barrel independently of the others.

7. In a pencil, a cylindrical hollow barrel, and a plurality of segmental crayons slidably mounted in and filling said barrel, the inner longitudinal edges of said crayons being at the longitudinal axis of said barrel, longitudinal guide ribs on the inside of said barrel and extending towards said axis, and means for projecting any of said crayons from the barrel independently of the others.

8. In a pencil, a cylindrical hollow barrel, and a plurality of segmental crayons slidably mounted in and filling said barrel, the inner longitudinal edges of said crayons being at the longitudinal axis of said barrel, longitudinal guide ribs on the inside of said barrel and extending towards said axis, a plurality of longitudinal slots in said barrel approximately midway between said ribs, and means for projecting any of said crayons from the barrel independently of the others.

9. In a pencil, a cylindrical hollow barrel, and a plurality of segmental crayons slidably mounted in and filling said barrel, the inner longitudinal edges of said crayons being at the longitudinal axis of said barrel, and means extending through said slots for projecting any of said crayons from the barrel independently of the others.

JOSEPH DE MARIO.